United States Patent [19]

Shibata

[11] Patent Number: 4,556,435

[45] Date of Patent: Dec. 3, 1985

[54] METHOD FOR PREPARING CORES AND THE LIKE MADE FROM METALLIC OXIDES

[75] Inventor: Akira Shibata, Yokohama, Japan

[73] Assignee: Chugai Denki Kogyo, K.K., Tokyo, Japan

[21] Appl. No.: 666,268

[22] Filed: Oct. 29, 1984

[51] Int. Cl.$^4$ ............................................... C23F 7/04
[52] U.S. Cl. .................................................... 148/6.35
[58] Field of Search ...................... 148/6.35, 20.3, 105

[56] References Cited

U.S. PATENT DOCUMENTS 2,899,345  8/1959  Oshry .................................. 148/6.3

*Primary Examiner*—Sam Silverberg

*Attorney, Agent, or Firm*—Shlesinger, Fitzsimmons & Shlesinger

[57] ABSTRACT

A method for preparing cores and the like such as magnetic recording head cores. They are made from metallic alloy oxides such as ferrite and used as electric, electronic, or magnetic elements of electric appliances such as tape recorders and televisions. The method is characterized by covering alloy compacts in part or as whole by silver and then baking them in an oxygen atmosphere for a predetermined time and at a predetermined temperature, whereby constituents of the alloy compacts are converted to oxides under strict control. Silver converging baked cores may be utilized for attaching terminals.

4 Claims, No Drawings

METHOD FOR PREPARING CORES AND THE LIKE MADE FROM METALLIC OXIDES

BACKGROUND OF THE INVENTION

This invention relates to a method for making metallic cores and the like made from metallic oxides. Such cores made in accordance with this invention are most advantageously employable as electric, electronic, or magnetic elements for various appliances.

Cores made from oxides of specific alloys are widely used today as electric, electronic, or magnetic elements of electric appliances. A typical example of such cores is the well known ferrite core. Molds of this kind have been made generally by roasting a metallic alloy, prefiring it and molding its powders to a compact element, and then firing it again. As these manufacturing steps, especially roasting, prefiring and firing steps are largely influenced by oxygen, it is essential for producing cores of uniform electrical characteristics to take great care to control the amount of oxygen which is present during the steps. However, in practice, the control of the amount of oxygen is extremely difficult though not impossible. And, in fact, cores thus produced by conventional methods are checked of their characteristics for all of them. As their characteristics vary to each other and by each lot, a sampling inspection can hardly be adopted there.

BRIEF SUMMARY OF THE INVENTION

In view of above drawbacks to the conventional methods, this invention is to provide a novel method for making electric, electronic, or magnetic cores and the like from metallic oxides, said cores having stable and uniform structures and characteristics.

More specifically, this invention comprises roasting a metallic alloy for oxidation after having wrapped it in a film of silver. This silver film may be made from pure silver or internally oxidizable silver alloy, and the wrapped metallic alloy may be any metal alloy which can be internally oxidized under a partial pressure of oxygen and at a comparatively high temperature.

The working principle of this invention is given as follows.

While silver absorbs oxygen at an elevated temperature, it exhales oxygen upon cooling to room temperature and become pure silver, which has high electric conductivity though it is non-magnetic. Since the partial pressure of oxygen, which has been dissolved into silver at the elevated temperature, is comparatively low, and since an amount of oxygen which diffuses through the silver or silver alloy is constant at a predetermined specific temperature, and under an oxygen atmosphere of a predetermined specific pressure, an amount of oxygen which shall be diffused into a core metal via its silver wrapping for oxidizing the former, can readily and freely be controlled. In addition to this advantage, since the oxygen in this instance is diffused into the core metal through the silver, and consequently at a selected direction of paths of oxygen, crystalline grains oxidized and precipitated in the core metal are not arranged at random but can be prismatically aligned in the paths of oxygen.

In this invention, a metallic core of a desired configuration, which is to be wrapped or sandwiched in silver films and then internally oxidized, can be made by powder metallurgy, that is, by molding and sintering constituent metal powders to form the core into the desired configuration. However, it is preferable to make the metallic core from a molten metal alloy, because it shall not exhibit the porosity which is often seen in the one made powder metallurgically and which prevents the growth of crystalline grains beyond a certain size. For example, when soft ferrite is made from Ni-Zn-Fe powders by the aforementioned conventional method, a desired magnetic permeability is sometimes not obtained. This is because that while the magnetic permeability is often a function of a size of oxidized crystalline grains in the soft ferrite, the grains can not attain a desired size on account of the porousness which is inherent to cores made by powder metallury.

DETAILED DESCRIPTION OF THE INVENTION

An example of the method in accordance with this invention is described hereinunder.

A molten alloy of Ni 15%-Zn 35%-Fe 50% was prepared, and formed into an ingot. The ingot was hot rolled to a sheet. This sheet was sandwiched between a pair of sheets of pure silver, and was rolled to form an integrate wafer sheet. Chips were cut off from this sheet. The chips were baked in an $O_2$ atmosphere for 3 hours. In order to examine metallurgical structures, several such baked chips were transversely cut and observed by a microscope of 200 magnifications. Crystalline grains which were observed had diameters of about $10\mu$. Their permeabilities were uniformly about 100 $\mu o$, and they did not vary substantially from each other. The chips or cores thus obtained can be used as magnetic recording head cores, magnetic erasing head cores, EI and U cores, convergence cores for color TVs, thermo-switch cores, irradiation absorber for electric cookers, flyback cores for color TVs, and so on, when their outer silver films have been removed by washing them by acid. When and if the outer silver films are not removed, wire terminals can be brazed to the outer silver films, and the cores then can be employed as noise filters for SCR noise, line noise filters for TV receivers, inductors for stereo loud speakers, and so on.

In the above example, instead of rolling the alloy sheet, which has been rolled to a wafer, between silver sheets, the wafer can be covered by hot dipping it in silver.

As described above, by this invention, cores made from metallic oxides for electric appliances can be obtained under a method allowing strict control of their electric characteristics and capacities. The silver films covering the cores can be removed by machining or chemically when desired. Or, the silver films can be utilized for connecting the cores to wire terminals. It shall be noted that "cores" as used throughout this specification and appended claims means chips or sheets of any configuration and of any dimensions.

I claim:

1. A method for making cores and the like from metallic oxides for use as electric, electronic, or magnetic elements for appliance; which comprises
   preparing metal alloy cores of a desired configuration from metallic constituents which form metallic oxides when they are baked,
   covering each of said alloy cores at least in part with a film of silver or an alloy thereof, and
   baking the coated cores in an oxygen atmosphere for a predetermined time and at a predetermined temperature to produce uniform electrical characteristics by controlling the diffusion of oxygen thru the silver film.

2. A method as claimed in claim 1, including removing at least part of the silver film from the baked alloy cores.

3. A method as claimed in claim 1, including attaching terminals to at least certain of the silver films covering the baked alloy cores.

4. A method as claimed in claim 1, in which the alloy cores are made from a molten alloy thereof.

* * * * *